United States Patent
Schaefer et al.

[11] Patent Number: 6,000,742
[45] Date of Patent: Dec. 14, 1999

[54] MULTI-POSITIONAL SEAT MOUNTING APPARATUS

[75] Inventors: Donald Richard Schaefer, Waterford; Frank Qiukui Liu, Canton; Lucian Bela, Troy; Leon Bruce Liu, Novi; Majid Hammoud, Plymouth, all of Mich.

[73] Assignee: Ford Motor Company, Dearborn, Mich.

[21] Appl. No.: 09/241,881

[22] Filed: Feb. 1, 1999

[51] Int. Cl.⁶ ..................................................... B60N 2/10
[52] U.S. Cl. ........................................ 296/65.09; 297/336
[58] Field of Search ..................................... 297/331, 335, 297/336, 378.12; 296/65.01, 65.09

[56] References Cited

U.S. PATENT DOCUMENTS

| | | | |
|---|---|---|---|
| 4,695,094 | 9/1987 | Siebler | 297/331 |
| 4,840,427 | 6/1989 | Hong | 296/65.09 X |
| 5,238,285 | 8/1993 | Holdampf et al. | |
| 5,498,051 | 3/1996 | Sponsler et al. | |
| 5,593,208 | 1/1997 | Mitschelen et al. | 297/336 |
| 5,626,391 | 5/1997 | Miller et al. | |
| 5,634,686 | 6/1997 | Okazaki | 297/336 |
| 5,641,202 | 6/1997 | Rus | 297/336 X |
| 5,662,368 | 9/1997 | Ito et al. | 297/336 X |
| 5,765,894 | 6/1998 | Okazaki et al. | 297/336 X |

*Primary Examiner*—Peter R. Brown
*Attorney, Agent, or Firm*—Gregory P. Brown

[57] ABSTRACT

A seat mounting apparatus for supporting a seat allows the seat to be positioned in three possible positions allowing for improved ingress/egress and cargo carrying. The seat mounting apparatus includes a seat back frame (28), a seat bottom frame (36), a front leg (50), and a rear leg (44). A guide mechanism (59) is disposed between the seat bottom frame and the front leg for guiding the front leg. A reclining mechanism (91) is interposed between the seat back frame and the seat bottom frame for allowing the seat back frame to move between first and second reclined positions and into a first folded position. A front release mechanism (61) is interposed between the seat bottom frame and the front leg for controlling relative motion between the front leg and the seat bottom upon actuation of the front release mechanism. A coupler mechanism (79) is disposed between the seat back frame and the rear leg and is connected to the front leg for positioning the seat back frame into a second folded position over a lowered seat bottom frame. A rear release mechanism (108) is interposed between a bottom end (46) of the rear leg and a floor (20) for releasing the bottom end of the rear leg from being rigidly connected to the floor such that with the seat back frame in the first folded position, the seat can be displaced from a seated position to a tumbled position for improved ingress and egress.

14 Claims, 7 Drawing Sheets

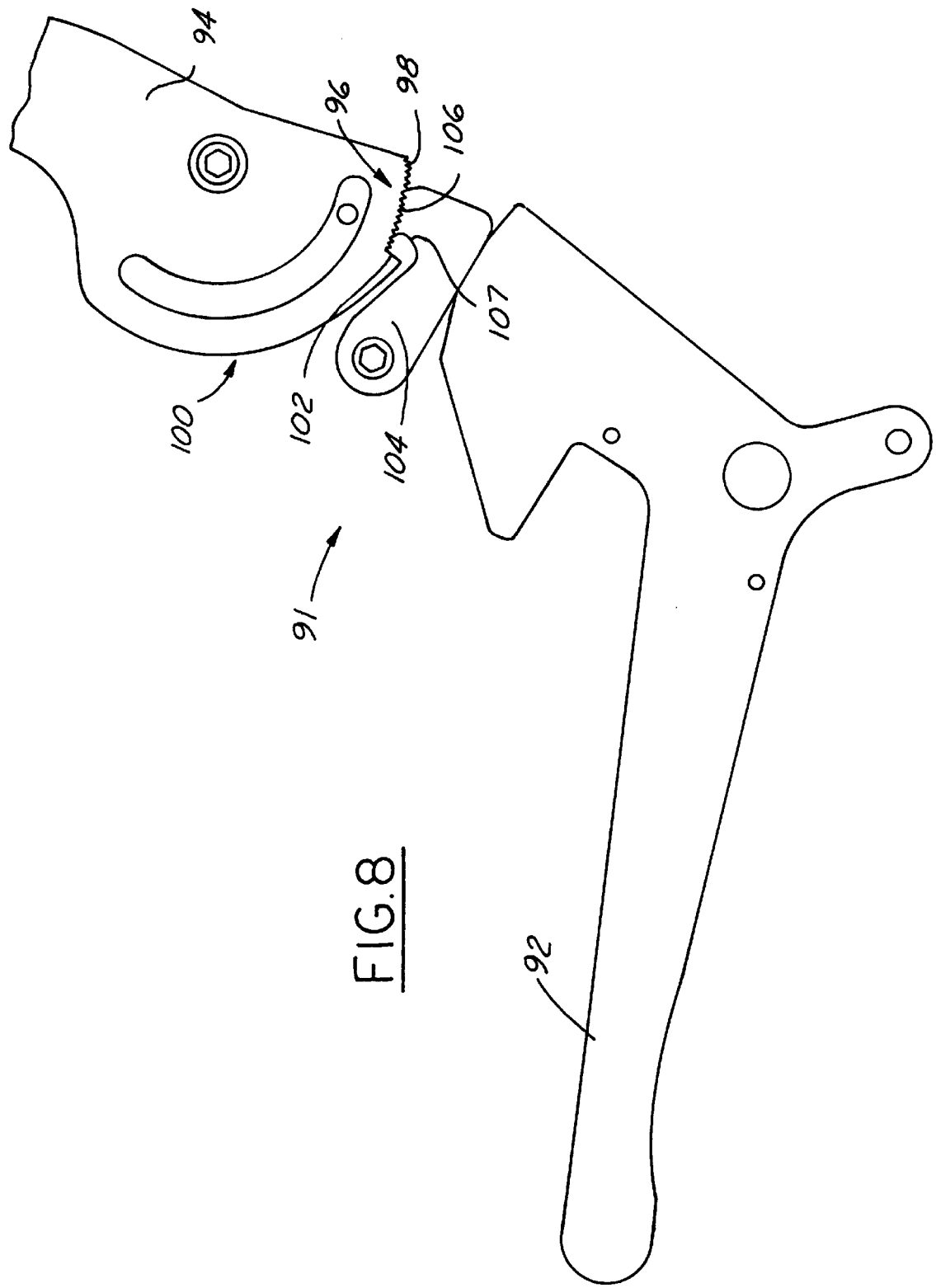

MULTI-POSITIONAL SEAT MOUNTING APPARATUS

BACKGROUND OF THE INVENTION

1. Field of the Invention

This invention relates generally to seat assemblies for use within motor vehicles and, more particularly, to foldable seat assemblies.

2. Disclosure Information

Multipurpose vehicles are very popular due to their ability to conveniently carry several passengers or alternatively haul large quantities of cargo. To facilitate these attributes, rear seating areas have been the subject of considerable improvement of late. In particular, seats were previously removed to provide convenient cargo carrying with a flat load floor. Customers have generally found removal of the seats unacceptable due to their bulk and heavy weight. For those customers who prefer to haul several passengers, third row seats have become popular. Unfortunately, some customers have been dissatisfied with the difficulty associated with getting into and out of a third row seat, primarily due to the difficulty of getting past the second row seat. Traditionally, this problem has been solved by providing a tip forward seat to increase access to the third row seat, making it more difficult to remove the third row seat when the customer wishes to haul cargo.

It would therefore be desirable to provide a seat mounting mechanism which is capable of allowing movement of a seat from a seated position into a tumbled forward position for improved access to a third row passenger seat in addition to a dropped and folded position for convenient cargo carrying, eliminating the need to remove otherwise heavy and bulky seats.

SUMMARY OF THE INVENTION

According to the present invention, a seat mounting apparatus for supporting a seat has been discovered which allows the seat to be positioned in any of three possible positions allowing for improved ingress/egress and cargo carrying. The seat mounting apparatus includes a seat back frame having upper and lower ends and an outer side; a seat bottom frame having forward and rearward ends and an outer side; a front leg having upper and bottom ends, the bottom end being pivotally attached to the floor; and a rear leg having upper and bottom ends.

A guide mechanism is disposed between the seat bottom frame and the front leg for guiding the front leg. A reclining mechanism is interposed between the seat back frame and the seat bottom frame for allowing the seat back frame to move between first and second reclined positions and into a first folded position. A front release mechanism is interposed between the seat bottom frame and the front leg. The front release mechanism controls motion between the front leg and the seat bottom only upon actuation of the front release mechanism. A coupler mechanism is disposed between the seat back frame and an upper end of the rear leg and is connected to the front leg. The coupler mechanism positions the seat back frame into a second folded position over a lowered seat bottom frame. A rear release mechanism is interposed between the bottom end of the rear leg and the floor. The rear release mechanism is such that with the seat back frame in the first folded position, the seat can be displaced from an upright seating position to a tumbled position for improved ingress and egress.

It is an advantage of the present that a seat mounting apparatus is provided which is conveniently movable from an upright seating position to either a reclined position or a tumbled forward position or a dropped and folded position.

BRIEF DESCRIPTION OF THE DRAWINGS

FIG. 8 is a side view of a reclining mechanism used in a passenger seat in accordance with the present invention.

DETAILED DESCRIPTION OF THE PREFERRED EMBODIMENT

Figure 1:
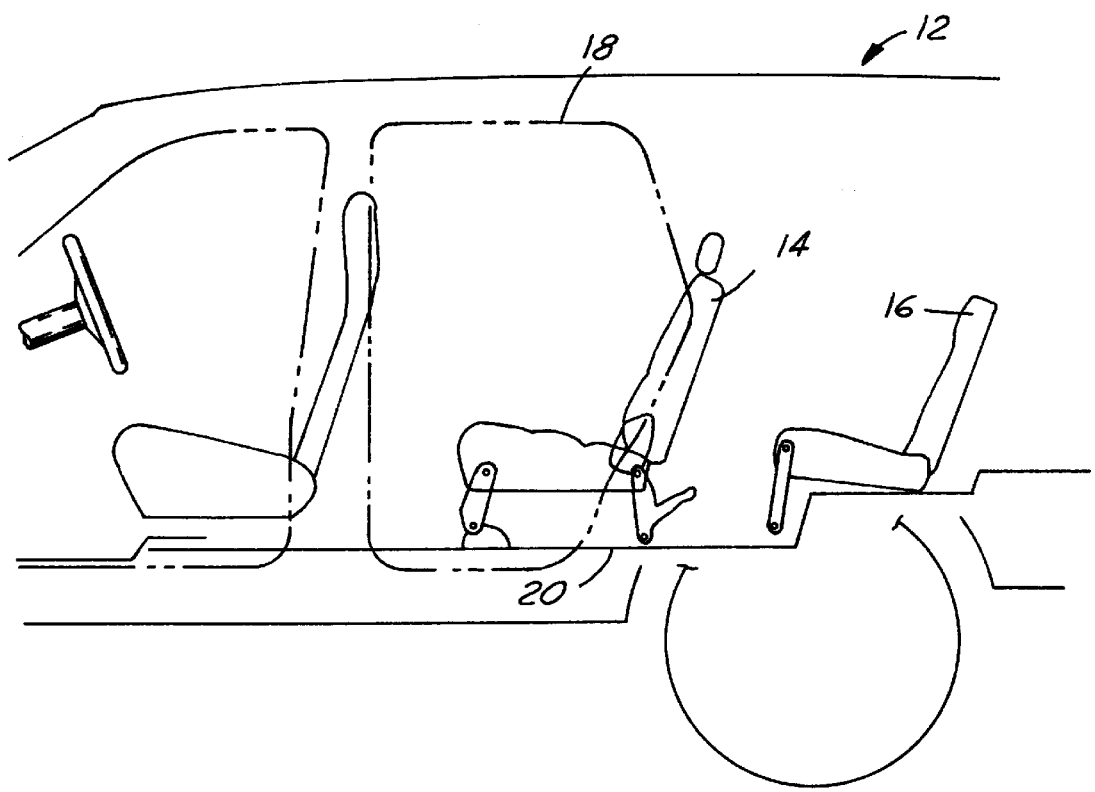
FIG. 1 is a side view of a seating arrangement within a motor vehicle with all seats in the upright seating position in accordance with the present invention.
Figure 2:
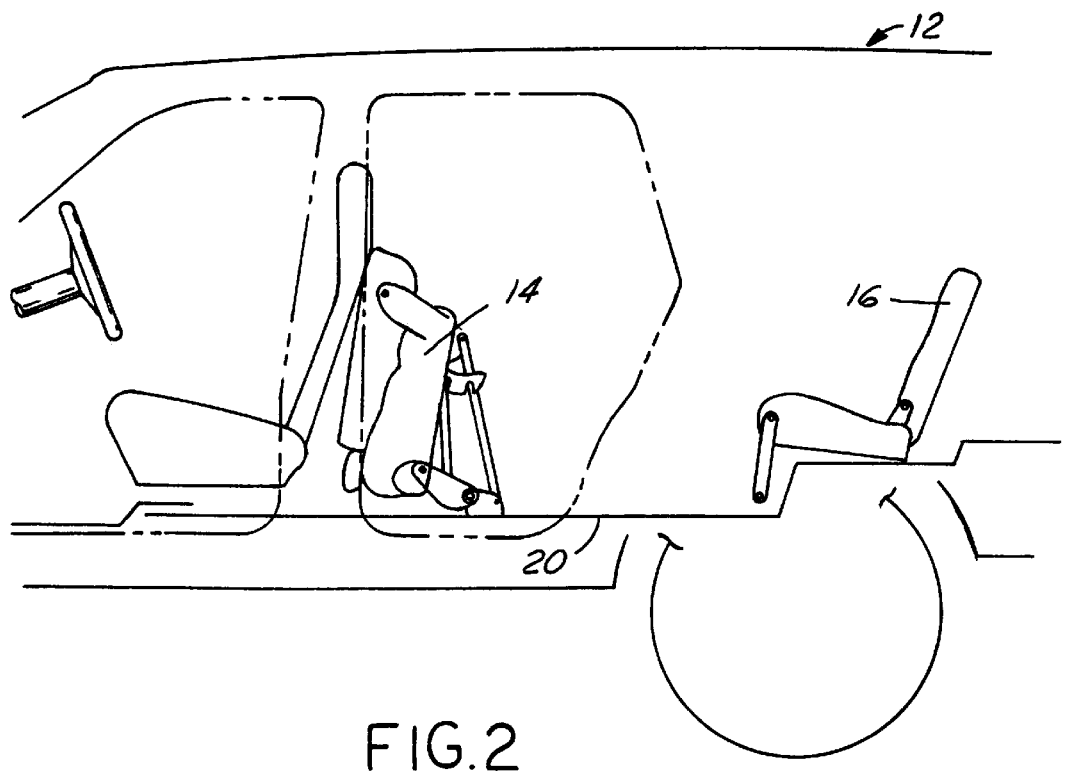
FIG. 2 is a side view of a seating arrangement within a motor vehicle with the second row seat in the tumbled position in accordance with the present invention.
Figure 3:
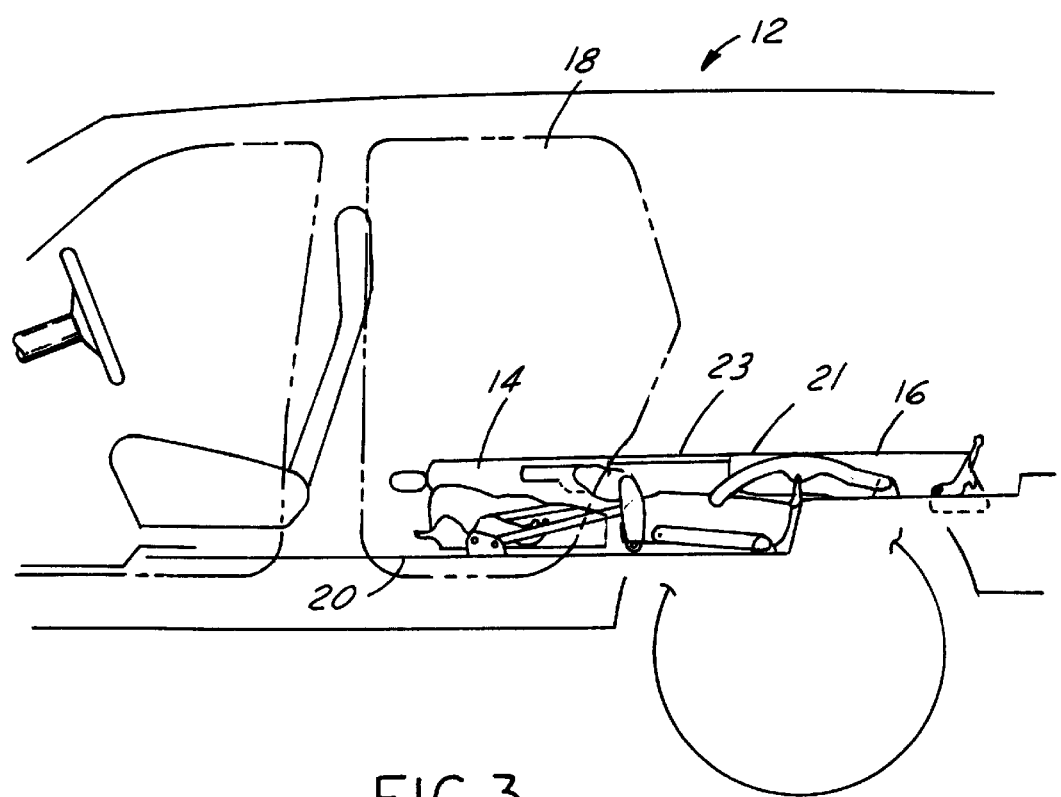
FIG. 3 is a side view of a seating arrangement within a motor vehicle with the second row seat in the dropped and folded position in accordance with the present invention.

Referring now to FIGS. 1–3, a three-row seating arrangement of a motor vehicle 12 is shown. Typically, passengers enter and exit the second row seats 14 and third row seats 16 through a second entrance 18. To improve ingress and egress for the third row seat 16, the present invention allows the second row seat 14 to tumble forward, as shown in FIG. 2, exposing a greater portion of a floor 20, thereby improving access to the third row seat 16. Additionally, when it is desired to provide maximum cargo capability for the vehicle, the present invention allows the second row seat 14 to drop and fold, as shown in FIG. 3, to provide a substantially flat load floor 21 with the third row seats 16. A gap filler 23 may be provided to complete the load floor 21 between the second row seat 14 and third row seat 16.

Figure 5:
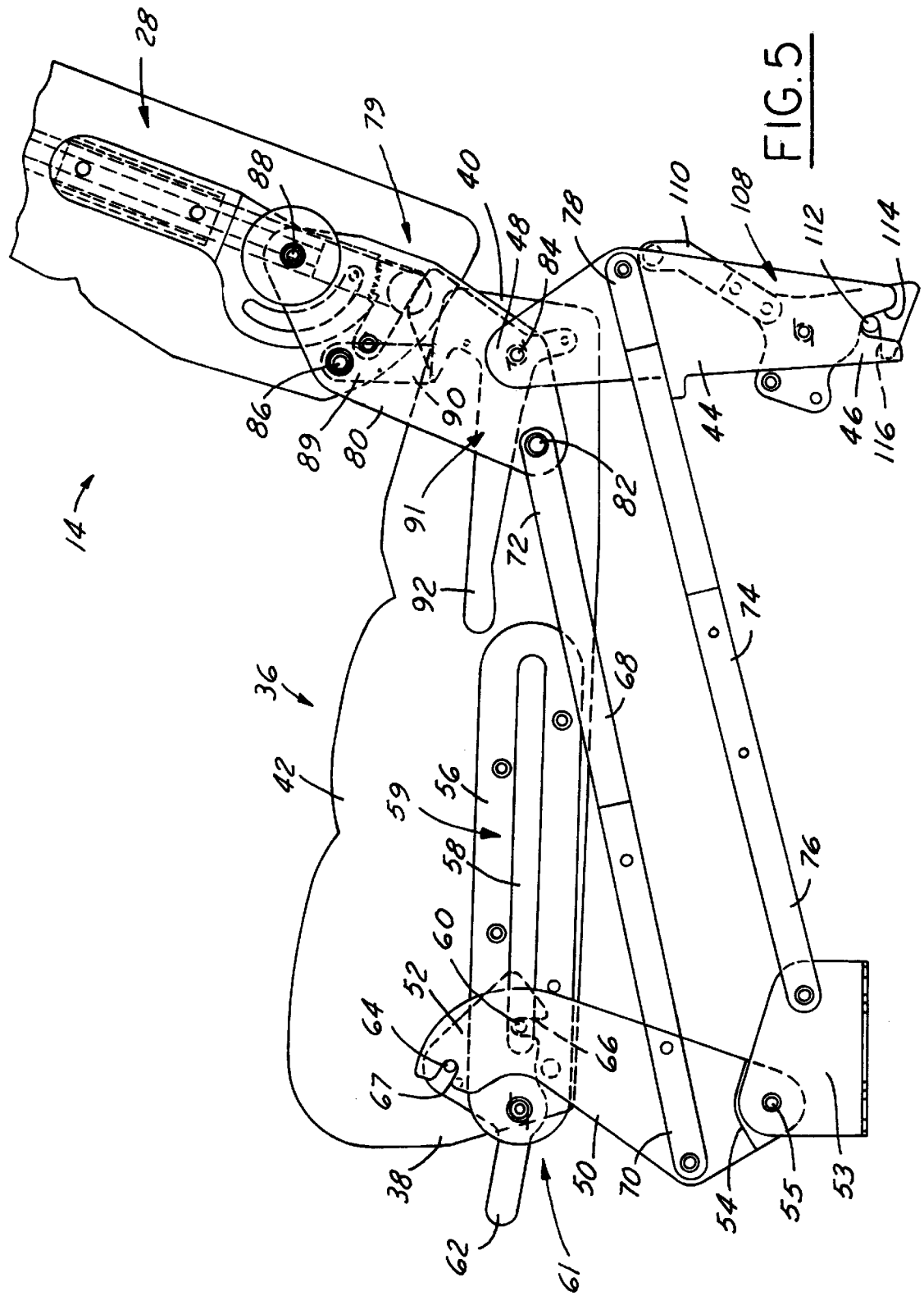
FIG. 5 is a side view of a passenger seat placed in an upright seating position in accordance with the present invention.
Figure 6:
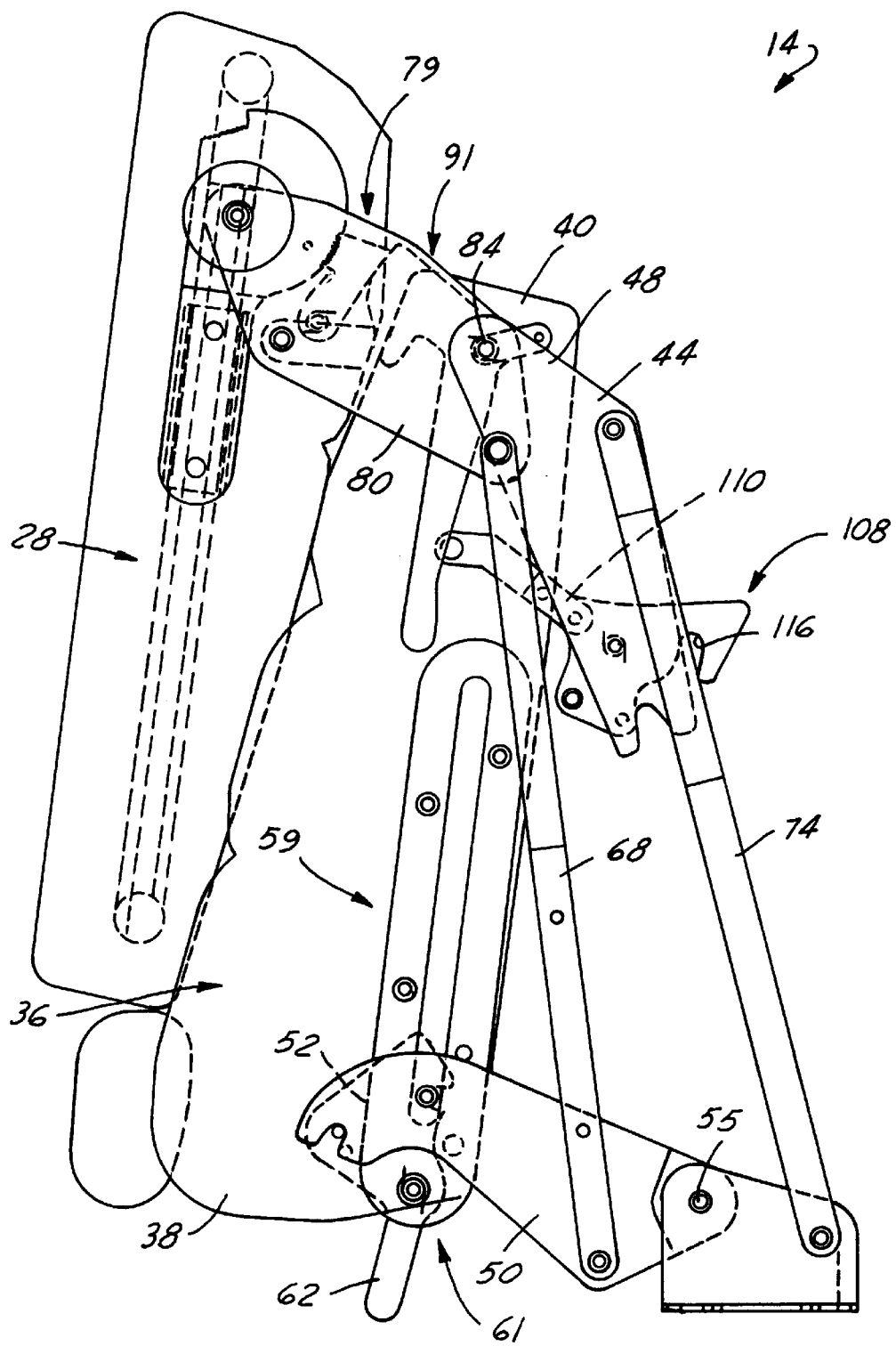
FIG. 6 is a side view of a second passenger seat in a tumbled position in accordance with the present invention.
Figure 7:
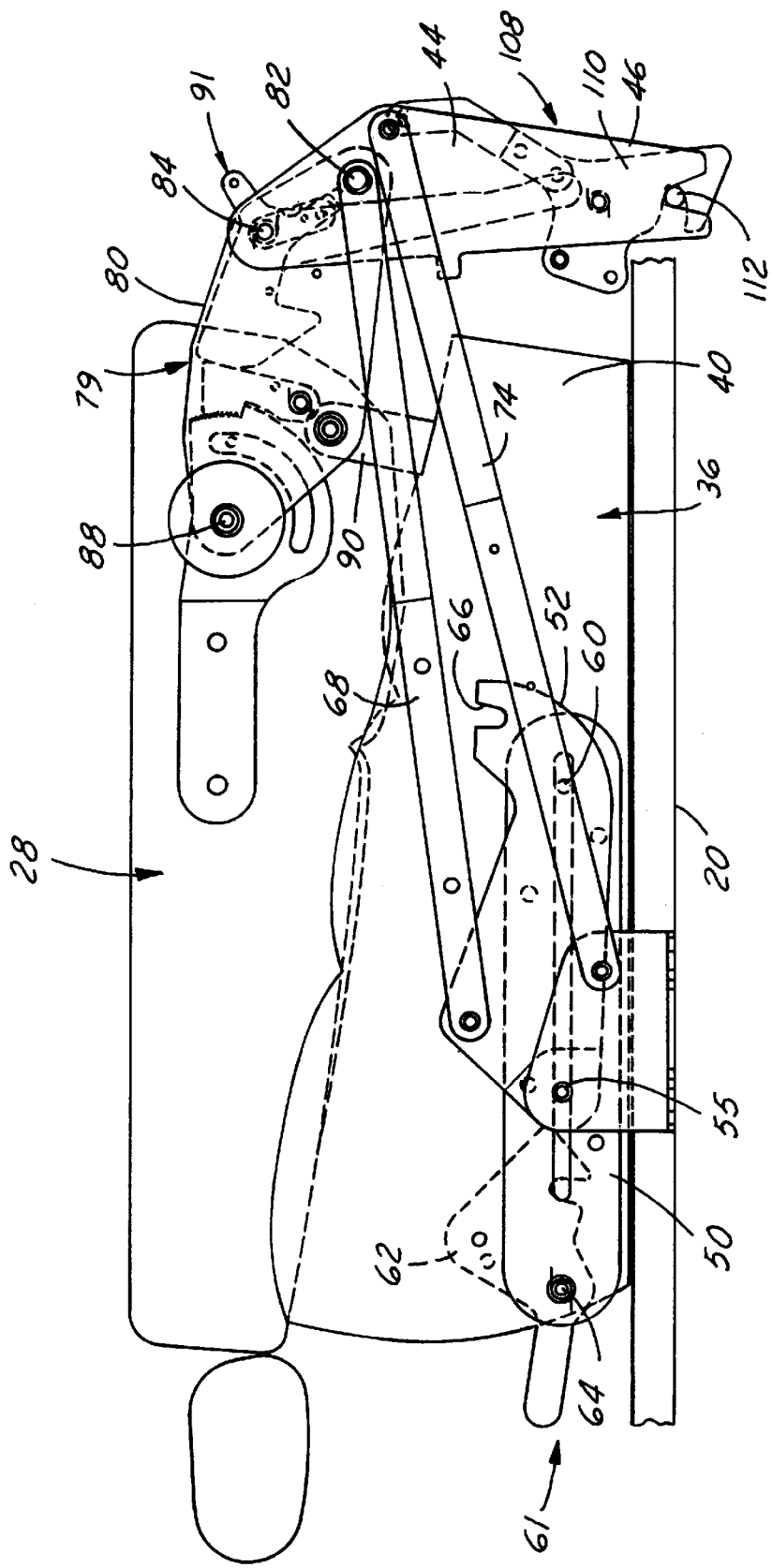
FIG. 7 is a side view of a second passenger seat in a dropped and folded position in accordance with the present invention.

Referring now to FIGS. 5–7, a left side view of the second row seat 14 is shown and will now be described. To simplify the description of the second row seat 14, only one side will be described, it being understood that both sides, unless otherwise mentioned, are symmetrically opposite. Furthermore, some of the components such as releases and pawl and sector combinations may be shown on one or both sides, however, this is a matter of design choice, with any combination being considered within the scope of the present invention. In addition, while the preferred embodiment discloses a second row seat as an example of the present invention, it should be understood that the present invention can be incorporated into any row within the motor vehicle.

Figure 4:
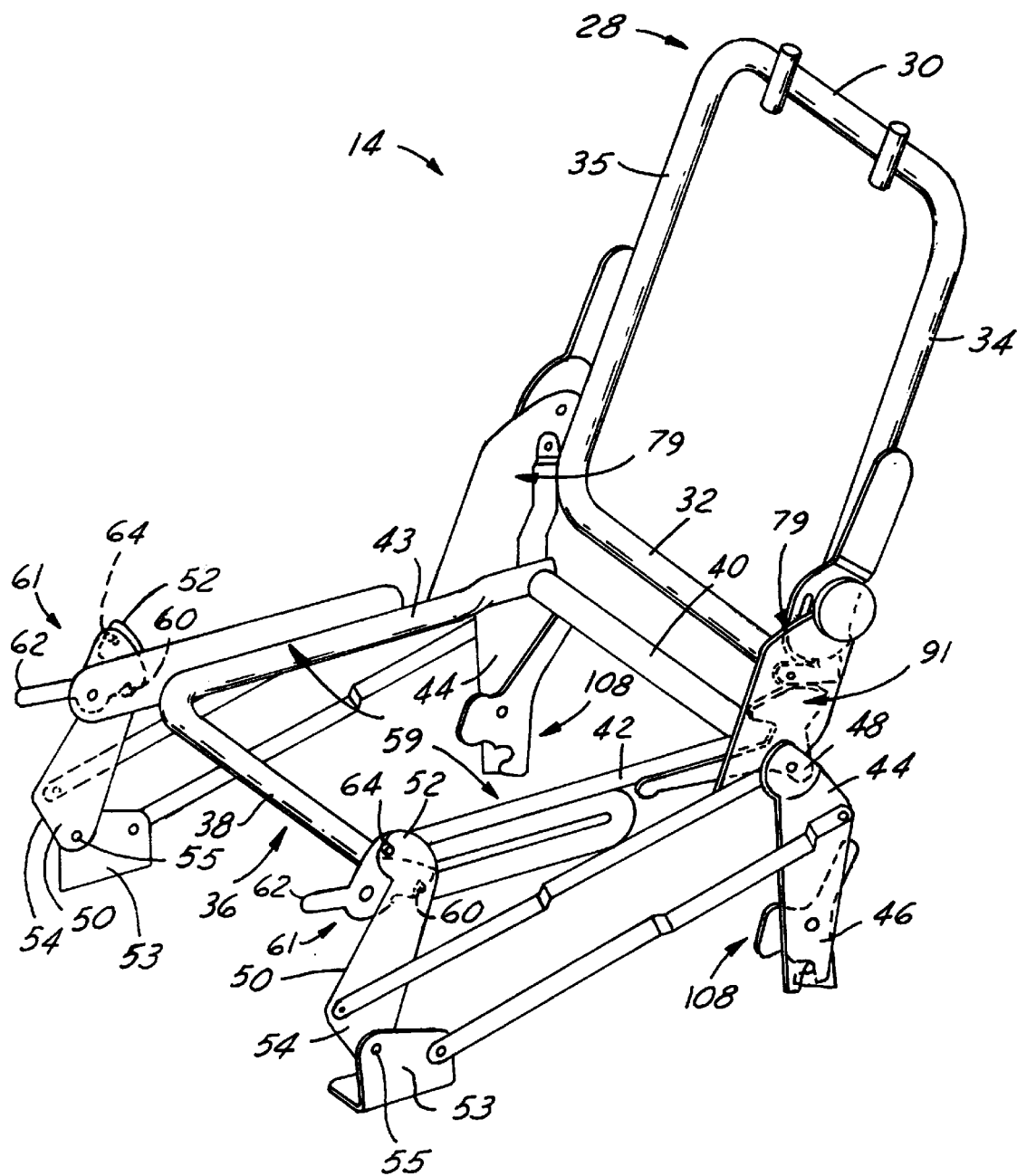
FIG. 4 is a perspective view of a seat mechanism constructed in accordance with the present invention.

The second row seat 14 includes a seat back frame 28 and a seat bottom frame 36 enclosed in cushions for comfort. For clarity, the frames are shown in FIG. 4, with the frames being covered by the cushion in the remaining figures. Those skilled in the art should appreciate that while a tube frame has been described here, the operability and functionality of the present invention is not dependent on any specific frame construction. Many equivalents exist, such as stamped, cast metal, and molded structural reinforced plastics.

Referring now to FIG. 4, a seat back frame 28 having an upper end 30, a lower end 32 disposed opposite therefrom, and outer and inner sides 34, 35 interconnecting with the upper and lower ends 30, 32. The second row seat 14 also includes a seat bottom frame 36 having a forward end 38, a rearward end 40 positioned opposite therefrom, and outer and inner sides 42, 43 interconnecting with the forward and rearward ends 38, 40. The seat back and seat bottom frames 28, 36 are supported above the floor by a pair of front legs 50 and a pair of rear legs 44. The front leg 50 includes an upper end 52 and a bottom end 54 which is pivotally attached to a floor mounting bracket 53 using a front leg pin 55. The rear leg 44 includes an upper end 48 which is pivotally attached to a coupler 80 and a bottom end 46.

Referring now to FIG. 5, a rear release mechanism 108, including a rear release lever 110, is located between the bottom end 46 of the rear leg 44 and the floor. The rear release lever 110, including a rear release notch 116, is pivotally connected to the bottom end 46 of the rear leg 44. A rear leg notch 114 is located in the bottom end 46 of the rear leg 44. The rear release notch 116 engages a rear striker 112, which is rigidly mounted to the floor, and thereby retains the rear leg notch 114 in the rear striker 112.

A retractor link 74 provides a connection between the upper end 48 of the rear leg 44 and the floor mounting bracket 53. The retractor link 74 includes a third end 76 that is pivotally attached to the floor mounting bracket 53 and a fourth end 78 that is pivotally attached to the rear leg 44. Similarly, an upper link 68 extends nearly parallel to the retractor link 74 and includes a first end 70 pivotally attached to the front leg 50 and a second end 72 pivotally attached to a coupler 80.

A front release mechanism 61, including a front release lever 62, controls relative motion between the front leg 50 and the seat bottom frame 36. A front release pin 64 is attached to the front release lever 62 and engages a u-shaped front leg notch 67 positioned in the upper end 52 of the front leg 50. Similarly, a u-shaped front release notch 66, positioned in the front release lever 62, engages a guide pin 60 attached to the upper end 52 of the front leg 50, locking to maintain the front leg 50 to the seat bottom frame 36 in an upright seating position.

A guide mechanism 59, including the guide pin 60, is positioned between the seat bottom frame 36 and the front leg 50. The guide pin 60 maintains a slidable relationship between the seat bottom frame 36 and the upper end 52 of the front leg 50. The guide pin 60 is located within a channel 58 which extends a predetermined distance between the forward end 38 and rearward end 40 of the seat bottom frame 36 and is disposed in a guide member 56. The guide member 56 attaches to the outer side 42 of the seat bottom frame 36 and is positioned parallel to the seat bottom frame 36 forward of the coupler 80.

A coupler mechanism 79, including the coupler 80, provides a connection between the seat back frame 28 and the seat bottom frame 36. The coupler 80 includes a first coupler pin 82 pivotally connected to the second end 72 of the upper link 68 and a fourth coupler pin 88 pivotally connected to the seat back frame 28. A third coupler pin 86 pivotally connects to an upwardly extending upper link end 89 of a rear link 90 that is rigidly attached to the seat bottom frame 36. A second coupler pin 84 connects the upper end 48 of the rear leg 44 to the coupler 80.

A reclining mechanism 91, including a reclining lever 92, is positioned between the seat back frame 28 and the seat bottom frame 36 and allows the seat back frame 28 to move between first and second reclined positions and into a first folded position. The reclining lever 92 is pivotally connected to the upper end 48 of the rear leg 44 through the second coupler pin 84. Referring now to FIG. 8, the reclining lever 92 maintains an engaging relationship between a pawl member 104 and a sector 94. The sector 94, attached to the seat back frame through the fourth coupler pin, includes a first arcuate portion 96 having a set of sector teeth 98 and a second arcuate portion 100 adjacent the first arcuate portion 96 and having a larger diameter than the first arcuate portion 96. The sector 94 also includes a radially extending edge 102 located between the first arcuate portion 96 and the second arcuate portion 100. The pawl member 104 includes a set of pawl teeth 106 for matingly engaging the set of sector teeth 98 with the reclining lever 92 in the locked position. The pawl member 104 also includes a shoulder 107 for engaging the radially extending edge 102 on the sector 94 with the reclining lever 92 in a first released position.

Referring now to FIGS. 5–8, the operation of the present invention will now be described. To rotate the seat back frame 28 from the first reclined position to the second reclined position, the operator rotates the reclining lever 92 from a locked position to the first released position, disengaging the set of pawl teeth 106 from the set of sector teeth 98 and allowing the sector 94 to rotate. As the sector 94 rotates, the seat back frame 28 rotates about the fourth coupler pin 88. The shoulder 107 of the pawl 104 engages with the radially extending edge 102 of the sector 94, thereby maintaining the pawl member 104 within the first arcuate portion 96 of the sector 94. When the operator releases the reclining lever 92, the set of pawl teeth 104 reengage with the set of sector teeth 106, locking the seat back frame 28 in the second reclined position.

To rotate the second row seat from the upright seating position as shown in FIG. 5 to the tumbled position as shown in FIGS. 2 and 6, the operator rotates the reclining lever 92 to a second released position to rotate the seat back frame 28 into the first folded position. With the reclining lever 92 in the second released position, the set of pawl teeth 104 disengage with the set of sector teeth 106. In addition, the shoulder 107 does not engage the radially extending edge 102, thereby allowing the sector 94 to rotate through an arc defined by the first arcuate portion 96 and the second arcuate portion 100. This rotation corresponds to the seat back frame 28 rotating from the upright seating position to the first folded position.

Next, after the operator rotates the seat back frame 28 to the first folded position, the operator rotates the rear release lever 110 from an applied position to a released position to disengage the rear release notch 116 from the rear striker 112. This disengagement allows the operator to rotate the front leg 50 counterclockwise about the front leg pin 55. As the front leg 50 pivots, the seat bottom frame 36, the coupler 80, and the seat back frame 28 follow the rotation of the front leg 50 as all are interconnected in a non-rotatable manner. In addition, the retractor link 74 causes the upper end 48 of the rear leg 44 to rotate about the second coupler pin 84 counterclockwise. This retraction of the rear leg 44 provides improved ingress/egress by withdrawing the rear leg 44 from the additional opening created by the tumbling of the second row seat 16.

To move the second row seat 16 from the upright seating position shown in FIGS. 1 and 5 to the dropped and folded position shown in FIGS. 3 and 7, the operator pivots the front release lever 62, releasing the upper end 52 of the front leg 50 from the seat bottom frame 36. Next, the operator pushes the seat back frame 28 forward and downward, rotating the seat back frame 28 counterclockwise about the fourth coupler pin 88 and rotating the coupler 80 about the second coupler pin 84 as the rear leg 44 remains stationary. Furthermore, the movement of the upper link 68 with the rotating coupler 80 induces the front leg 50 to rotate in the clockwise direction about the front leg pin 55. As the front leg 50 rotates, the guide pin 60 translates along the channel 58 toward the rearward end 40 of the seat bottom frame 36, lowering the seat bottom frame 36 to the floor 20. As the seat bottom frame 36 lowers, the rear link 90 pivots about the third coupler pin 86, maintaining the connection between the seat bottom frame 36 and the coupler 80. In the dropped and folded position, the seat bottom frame 36 lies substantially parallel to the floor 20, and the seat back frame 28 lies in a second folded position over the lowered seat bottom frame 36 also substantially parallel to the floor 20.

The foregoing description presents a preferred embodiment of the present invention. Details of construction have been shown and described for purposes of illustration rather than limitation. For example, it should be recognized to those skilled in the art that a spring-assist device could easily be incorporated into the design to urge the second row seat 14 from the upright seating position to the tumbled position, thus eliminating the need to manually rotate the second row seat 14. Other modifications and alterations of the invention will no doubt occur to those skilled in the art that will come within the scope and spirit of the following claims.

We claim:

1. A seat mounting apparatus for supporting a seat on a floor of a motor vehicle and for allowing the seat to be positioned in any of three possible positions allowing for improved ingress/egress and cargo carrying, said seat mounting apparatus comprising:

a seat back frame having upper and lower ends and an outer side;

a seat bottom frame having forward and rearward ends and an outer side;

a front leg having an upper and bottom ends, said bottom end being pivotally attached to the floor;

a rear leg having upper and bottom ends;

guide means disposed between said seat bottom frame and said front leg for guiding said front leg;

a reclining means interposed between said seat back frame and said seat bottom frame, said reclining means being operative to allow said seat back frame to move between first and second reclined positions and into a first folded position;

front release means interposed between said seat bottom frame and said front leg, said front release means being operative to allow relative motion between said front leg and said seat bottom only upon actuation of said front release means;

coupler means disposed between said seat back frame and an upper end of said rear leg and being connected to said front leg, said coupler means being operative to position said seat back frame into a second folded position over a lowered seat bottom frame upon release of said front release means such that the seat rests in a dropped and folded position for improved cargo loading, unloading and carrying capabilities; and rear release means interposed between said bottom end of said rear leg and the floor, said rear release means being operative to release said bottom end of said rear leg from being rigidly connected to the floor such that with said seat back frame in said first folded position, the seat can be displaced from a seated position to a tumbled position for improved ingress and egress.

2. The seat mounting apparatus according to claim 1, wherein said guide means further comprises:

a guide member attached to said outer side of said seat bottom frame;

a channel disposed in said guide member, and extending therein a predetermined distance between said forward and rearward ends of said seat bottom frame; and a guide pin attached to said front leg between said upper and bottom ends and being slidably disposed in said guide channel.

3. The seat mounting apparatus according to claim 1, wherein said coupler means further comprises:

an upper link having first and second ends, said first end being pivotally attached to said front leg;

a retractor link having third and fourth ends, said third end being pivotally attached to said floor and said fourth end being pivotally attached to said rear leg;

a coupler having a first coupler pin pivotally connected to said second end of said upper link, a second coupler pin pivotally connected to said upper end of said rear leg, a third coupler pin and a fourth coupler pin pivotally connected to said seat back frame; and a rear link rigidly attached to said seat bottom frame and extending to an upper link end pivotally connected to said third coupler pin on said coupler.

4. The seat mounting apparatus according to claim 1, wherein said reclining means further comprises:

a reclining lever pivotally connected to said upper end of said rear leg and adapted to be rotated from a locked position to first and second released positions;

a sector attached to said seat back frame, said sector having a first arcuate portion having a plurality of sector teeth thereon and a second arcuate portion adjacent to said first arcuate portion and having a larger diameter than said first arcuate portion, and a radially extending edge disposed between said first and second arcuate portions;

a pawl member having a plurality of pawl teeth for matingly engaging said plurality of sector teeth with said reclining lever in said locked position and a shoulder for engaging said radially extending edge on said sector with said reclining lever in said first released position so as to maintain said pawl within said first arcuate portion; and pawl urging means for retracting said pawl member sufficiently from said sector with said reclining lever in said second released position so as to allow clearance between said pawl member and second arcuate portion.

5. The seat mounting apparatus according to claim 1, wherein said front release means further comprises:

a front release lever pivotally connected to said seat bottom frame;

a front release pin connected to said front release lever and adapted to be engaged by said upper end of said front leg; and a front release notch having a u-shape and being adapted to engage a guide pin disposed on said front leg with the seat in said seated position.

6. The seat mounting apparatus according to claim 1, wherein said rear release means further comprises:

a rear release lever pivotally connected to said bottom end of said rear leg;

a rear striker rigidly mounted to the floor;

a rear leg notch in said bottom end of said rear leg; and a rear release notch disposed in said rear release lever and adapted to engage said rear striker and thereby retain said rear striker in said rear leg notch.

7. A seat mounting apparatus for supporting a seat on a floor of a motor vehicle and allowing the seat to be positioned in any of three possible positions allowing for improved ingress/egress and cargo carrying, said seat mounting apparatus comprising:

a seat back frame having upper and lower ends and an outer side;

a seat bottom frame having forward and rearward ends and an outer side;

a guide member attached to said outer side of said seat bottom frame;

a channel disposed in said guide member, and extending therein a predetermined distance between said forward and rearward ends of said seat bottom frame;

a front leg having upper and bottom ends, said bottom end being pivotally attached to the floor;

a guide pin attached to said front leg between said upper and bottom ends and being slidably disposed in said guide channel;

a rear leg having upper and bottom ends;

an upper link having first and second ends, said first end being pivotally attached to said front leg;

a retractor link having third and fourth ends, said third end being pivotally attached to said floor and said fourth end being pivotally attached to said rear leg;

a coupler having a first coupler pin pivotally connected to said second end of said upper link, a second coupler pin pivotally connected to said upper end of said rear leg, a third coupler pin and a fourth coupler pin pivotally connected to said seat back frame;

a rear link rigidly attached to said seat bottom frame and extending to an upper link end pivotally connected to said third coupler pin on said coupler;

a reclining means interposed between said seat back frame and said seat bottom frame, said reclining means being operative to allow said seat back frame to move between first and second reclined positions and into a first folded position;

front release means interposed between said seat bottom frame and said front leg, said front release means being operative to allow relative motion between said front leg and said seat bottom only upon actuation of said front release means, said relative motion being operative to position said seat back frame into a second folded position over a lowered seat bottom frame such that the seat rests in a dropped and folded position for improved cargo loading, unloading and carrying capabilities; and rear release means interposed between said bottom end of said rear leg and the floor, said rear release means being operative to release said bottom end of said rear leg from being rigidly connected to the floor such that with said seat back frame in said first folded position, the seat can be displaced from a seated position to a tumbled position for improved ingress and egress.

8. The seat mounting apparatus according to claim 7, wherein said reclining means further comprises:

a reclining lever pivotally connected to said upper end of said rear leg and adapted to be rotated from a locked position to first and second released positions;

a sector attached to said seat back frame, said sector having a first arcuate portion having a plurality of sector teeth thereon and a second arcuate portion adjacent to said first arcuate portion and having a larger diameter than said first arcuate portion, and a radially extending edge disposed between said first and second arcuate portions;

a pawl member having a plurality of pawl teeth for matingly engaging said plurality of sector teeth with said reclining lever in said locked position and a shoulder for engaging said radially extending edge on said sector with said reclining lever in said first released position so as to maintain said pawl within said first arcuate portion; and pawl urging means for retracting said pawl member sufficiently from said sector with said reclining lever in said second released position so as to allow clearance between said pawl member and second arcuate portion.

9. The seat mounting apparatus according to claim 7, wherein said front release means further comprises:

a front release lever pivotally connected to said seat bottom frame;

a front release pin connected to said front release lever and adapted to be engaged by said upper end of said front leg; and a front release notch having a u-shape and being adapted to engage said guide pin disposed on said front leg with the seat in said seated position.

10. The seat mounting apparatus according to claim 7, wherein said rear release means further comprises:

a rear release lever pivotally connected to said bottom end of said rear leg;

a rear striker rigidly mounted to the floor;

a rear leg notch in said bottom end of said rear leg; and a rear release notch disposed in said rear release lever and adapted to engage said rear striker and thereby retain said rear striker in said rear leg notch.

11. A seat mounting apparatus for supporting a seat on a floor of a motor vehicle and allowing the seat to be positioned in any of three possible positions allowing for improved ingress/egress and cargo carrying, said seat mounting apparatus comprising:

a seat back frame having upper and lower ends and at least one side;

a seat bottom frame having forward and rearward ends and at least one side;

at least one guide member attached to said at least one side of said seat bottom frame;

at least one channel disposed in said at least one guide member, and extending therein a predetermined distance between said forward and rearward ends of said seat bottom frame;

at least one front leg having upper and bottom ends, said bottom end being pivotally attached to the floor;

at least one guide pin attached to said at least one front leg between said upper and bottom ends and being slidably disposed in said at least one guide channel;

at least one rear leg having upper and bottom ends;

at least one upper link having first and second ends, said first end being pivotally attached to said at least one front leg;

at least one retractor link having third and fourth ends, said third end being pivotally attached to said floor and said fourth end being pivotally attached to said at least one rear leg;

at least one coupler having a first coupler pin pivotally connected to said second end of said at least one upper link, a second coupler pin pivotally connected to said upper end of said at least one rear leg, a third coupler pin and a fourth coupler pin pivotally connected to said seat back frame;

at least one rear link rigidly attached to said seat bottom frame and extending to an upper link end pivotally connected to said third coupler pin on said at least one coupler;

reclining means interposed between said seat back frame and said seat bottom frame, said at least one reclining means being operative to allow said seat back frame to move between first and second reclined positions and into a first folded position;

front release means interposed between said seat bottom frame and said at least one front leg, said front release means being operative to allow relative motion between said at least one front leg and said seat bottom only upon actuation of said front release means, said relative motion being operative to position said seat back frame into a second folded position over a lowered seat bottom frame such that the seat rests in a dropped and folded position for improved cargo loading, unloading and carrying capabilities; and rear release means interposed between said bottom end of said at least one rear leg and the floor, said rear release means being operative to release said bottom end of said at least one rear leg from being rigidly connected to the floor such that with said seat back frame in said first folded position, the seat can be displaced from a seated position to a tumbled position for improved ingress and egress.

12. The seat mounting apparatus according to claim 11, wherein said reclining means further comprises:

a reclining lever pivotally connected to said upper end of said at least one rear leg and adapted to be rotated from a locked position to first and second released positions;

a sector attached to said seat back frame, said sector having a first arcuate portion having a plurality of sector teeth thereon and a second arcuate portion adjacent to said first arcuate portion and having a larger diameter than said first arcuate portion, and a radially extending edge disposed between said first and second arcuate portions;

a pawl member having a plurality of pawl teeth for matingly engaging said plurality of sector teeth with said reclining lever in said locked position and a shoulder for engaging said radially extending edge on said sector with said reclining lever in said first released position so as to maintain said pawl within said first arcuate portion; and pawl urging means for retracting said pawl member sufficiently from said sector with said reclining lever in said second released position so as to allow clearance between said pawl member and second arcuate portion.

13. The seat mounting apparatus according to claim 11, wherein said front release means further comprises:

a front release lever pivotally connected to said seat bottom frame;

a front release pin connected to said front release lever and adapted to be engaged by said upper end of said at least one front leg; and a front release notch having a u-shape and being adapted to engage said at least one guide pin disposed on said at least one front leg with the seat in said seated position.

14. The seat mounting apparatus according to claim 11, wherein said rear release means further comprises:

a rear release lever pivotally connected to said bottom end of said at least one rear leg;

a rear striker rigidly mounted to the floor;

a rear leg notch in said bottom end of said at least one rear leg; and a rear release notch disposed in said rear release lever and adapted to engage said rear striker and thereby retain said rear striker in said rear leg notch.

* * * * *